Aug. 24, 1954
N. E. STARKEY
2,687,273
FUEL REGULATING VALVE WITH FLUID-PRESSURE SERVO
RESPONSIVE TO RATIO OF TWO PRESSURES
Filed June 15, 1951
2 Sheets-Sheet 1
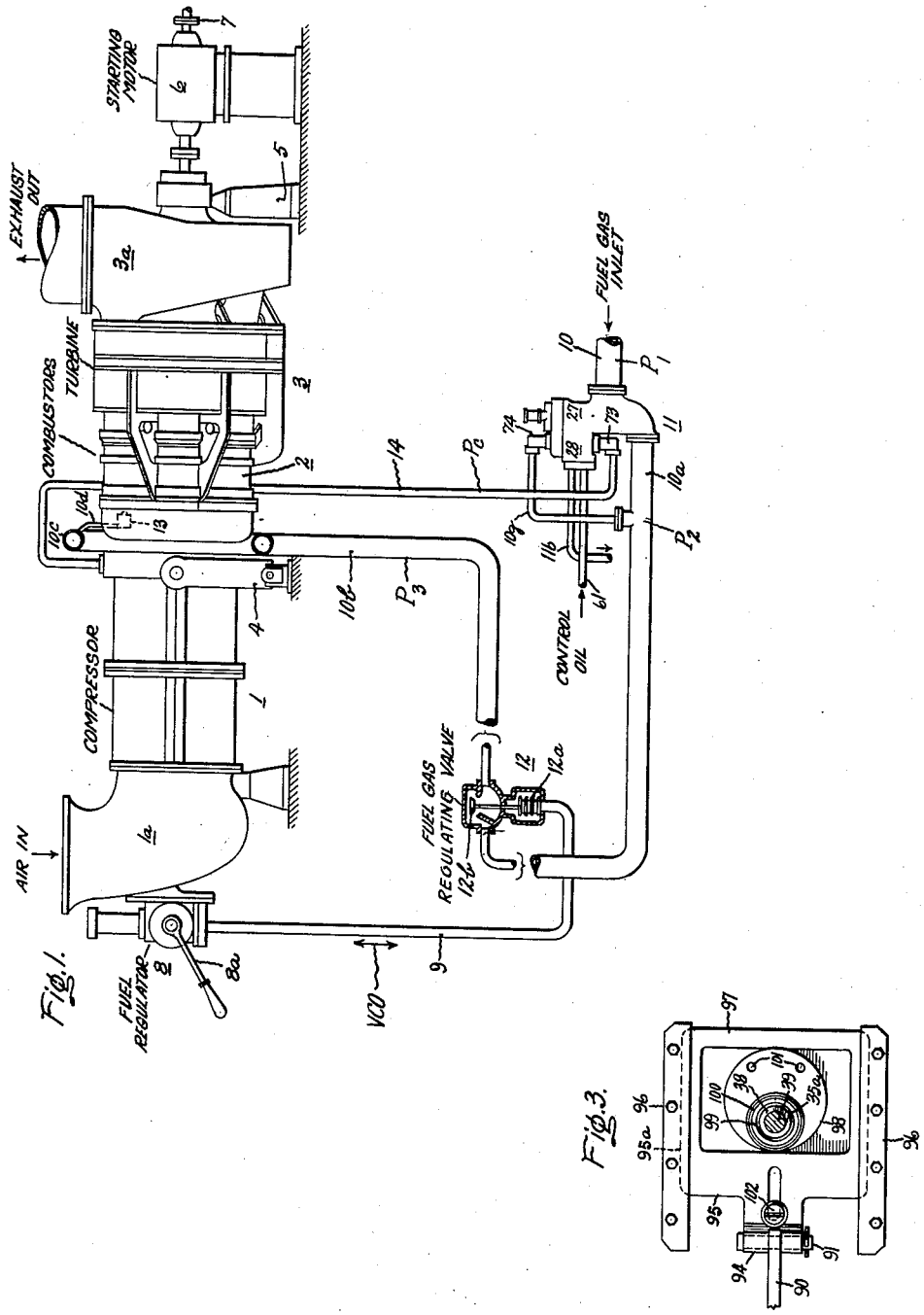
Inventor:
Neal E. Starkey,
by Ernest C. Britton
His Attorney.

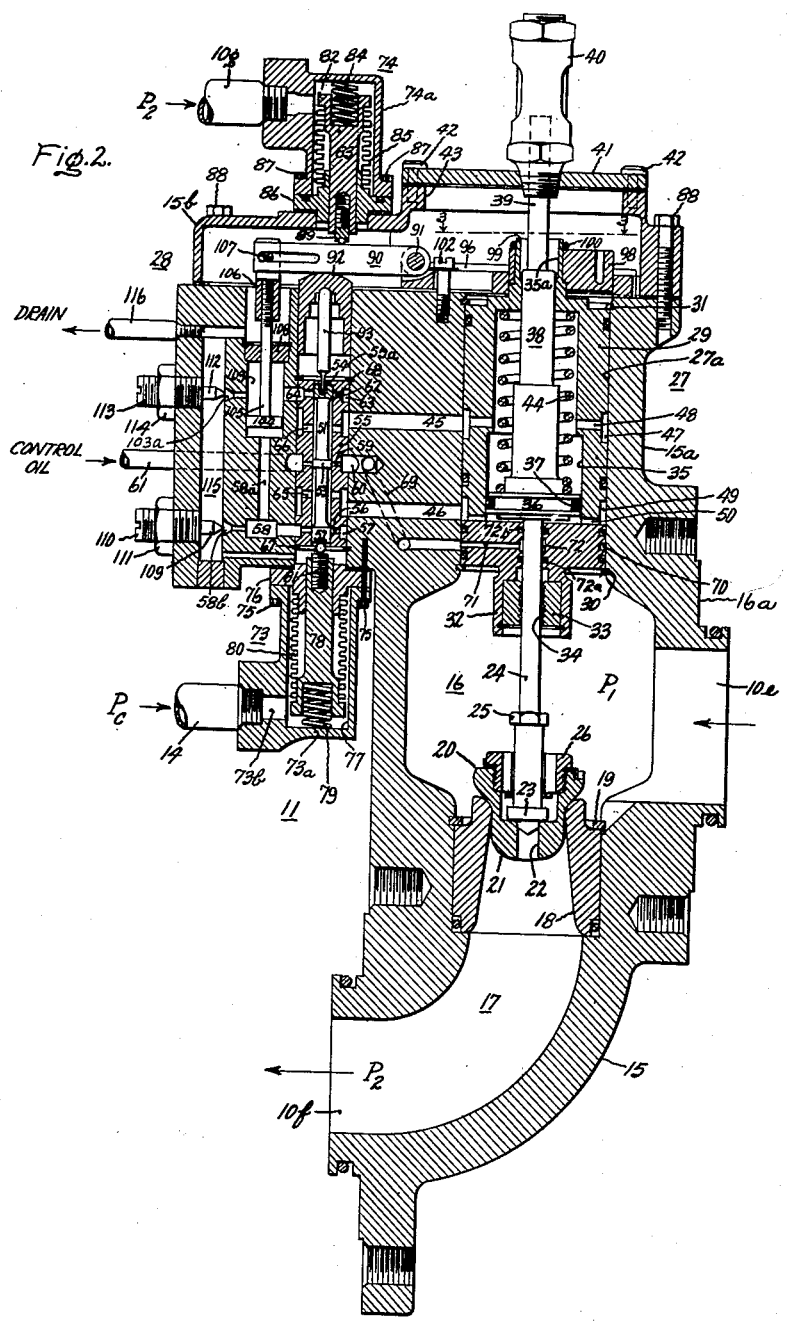

Patented Aug. 24, 1954

2,687,273

UNITED STATES PATENT OFFICE 2,687,273

FUEL REGULATING VALVE WITH FLUID-PRESSURE SERVO RESPONSIVE TO RATIO OF TWO PRESSURES

Neal E. Starkey, Schenectady, N. Y., assignor to General Electric Company, a corporation of New York Application June 15, 1951, Serial No. 231,703

4 Claims. (Cl. 251—28)

This invention relates to fluid fuel regulating systems, particularly to a fluid-pressure servomotor-operated throttling valve arranged to maintain a preselected ratio between two pressures occurring in a fluid pressure system such as the fuel supply system of a gas turbine driven powerplant.

The internal combustion turbine powerplant is found well suited to use natural gas or other combustible gas as a fuel. The required gas pressure varies from 1 to 150 pounds per square inch, gage, depending on the rate of air flow in the combustion chambers. As will be appreciated by those skilled in the art, the gas turbine is provided with a metering valve for regulating the flow of fuel to the combustion system at rates dictated by complex servo-mechanisms having components responsive to rotor speed, the temperature level at which the plant is operating, the load output desired, and various other pressure and/or temperature conditions obtaining within the powerplant. In order to simplify the control system for the fuel regulating valve, it is desirable to control the inlet pressure to the fuel valve so as to be proportional to the air flow in the combustion system. The pressure in the combustion system is proportional to the combustion air flow, consequently the inlet pressure to the fuel valve should preferably be made proportional to the combustion space pressure to obtain the desired proportionality to air flow. In a gas turbine powerplant for gas pipe-line pumping, for instance, the fuel gas is obtained from a source the pressure of which varies from 150 to 250 pounds per square inch, gage. Consequently, there is a need for introducing means for reducing the supply line pressure to values more suited to the requirements of the turbine.

Accordingly, the purpose of the present invention is to provide an auxiliary fuel gas pressure-reducing valve arranged to maintain a constant pressure ratio across the gas turbine regulating valve. More specifically, the special throttling valve which comprises the essence of this invention is adapted to maintain at a constant preselected value not the difference but the geometric ratio between the pressure of the fuel gas supplied to the powerplant regulating valve relative to the combustion space pressure. This very greatly simplifies the design problems encountered in providing a suitable fuel valve with the proper servo mechanism to control it in accordance with the requirements of the gas turbine.

A further object is to provide a pressure ratio regulating valve of the type described having a pressure-restored follow-up mechanism for stabilizing the action of the fluid-pressure servomotor which positions the pressure ratio controlling valve.

Other objects and advantages will become apparent from the following description taken in connection with the accompanying drawing, in which Fig. 1 is a diagrammatic representation of a gas turbine powerplant using fuel gas and having a pressure ratio regulating valve incorporating the invention, Fig. 2 is a full sectional view of the pressure ratio control valve itself, and Fig. 3 is a detail view of the pressure ratio adjusting means.

Generally stated, the invention is practiced by providing a specially arranged hydraulic or other fluid-pressure actuated servo mechanism for positioning a pressure reducing valve, the servo mechanism having pressure responsive components sensitive to the discharge pressure of the valve and to the combustion space pressure of the powerplant, these pressure responsive components acting in opposition on a pilot valve.

Referring now more particularly to Fig. 1, the pressure ratio control valve is shown applied to a gas turbine powerplant of the simple "open-cycle" type, comprising an axial flow compressor indicated generally at 1, a combustion system comprising a plurality of cylindrical combustors spaced circumferentially around the axis of the powerplant and indicated generally at 2, and an axial flow turbine, the exterior casing of which is indicated at 3. The compressor takes air from the surrounding atmosphere through an intake casing 1a and discharges directly into the combustors, from which hot motive fluid enters the turbine 3 and leaves through an exhaust casing 3a. The structural details of this gas turbine powerplant are not material to an understanding of the present invention; but it may be noted that the powerplant shown is as disclosed in the copending application of Alan Howard, Chester S. Rice, Bruce O. Buckland, Serial No. 754,002, filed June 11, 1947, now Patent No. 2,650,753, issued September 1, 1953, and assigned to the same assignee as the present application. This powerplant is a self-contained assembly, capable of being supported at its mid-portion by a pair of transversely spaced, vertically extending links 4 pivoted at their lower ends to the foundation of the machine, with a third point of support being furnished by a fixed pedestal 5. This support arrangement for the powerplant is disclosed more completely in the United States Patent of Alan Howard and Bruce O. Buckland, No. 2,632,997, issued March 31, 1953, and assigned to the same assignee as the present application.

The powerplant auxiliaries comprise a suitable starting motor indicated in Fig. 1 as being an electric motor 6 coupled to the exhaust end of the turbine-compressor rotor. This same end of the rotor may be provided with a coupling 7 for delivering the useful power output of the plant to the gas turbine pipeline compressor or other suitable load.

At the inlet end of the compressor are grouped a number of auxiliaries including a regulator 8 adapted to provide a variable control signal pressure for determining the rate of fuel supply to the combustion system. The details of this regulator 8 are not material to an understanding of the present invention, but it is a hydraulic-mechanical servo mechanism which may be responsive to numerous operating characteristics of the powerplant, such as rotor speed, motive fluid temperature, ambient atmospheric temperature and pressure, and the position of a control member which is set, either automatically or manually, to select the power output required. This last-mentioned control member is indicated diagrammatically in Fig. 1 as being a manual throttle lever 8a. Regulators of this general type are disclosed in the United States patents of Edwards, Garr, and Ogle, No. 2,622,393, issued December 23, 1952, and Starkey, Lewis, and Edwards, No. 2,558,592, issued June 26, 1951, both assigned to the same assignee as the present application. These regulators comprise means for integrating a number of input signals and producing in accordance therewith a hydraulic output signal pressure which is a function of the rate of fuel supply desired. This signal pressure is represented by the symbol "VCO" (variable control oil pressure) communicated through the pressure sensing conduit 9.

Fuel gas at pressure $P_1$ is taken through a supply conduit 10 from the main gas pipeline (not shown) through the special pressure ratio controlling valve indicated generally at 11, through conduit portion 10a to the main metering or throttle valve 12, and through conduit portion 10b to a fuel manifold 10c, thence by way of branch conduits 10d to a plurality of fuel nozzles 13, one of which is associated with each combustor.

As will be apparent from Fig. 1, the fuel regulating valve 12 incorporates a fluid pressure servomotor, indicated diagrammatically as comprising a flexible bellows 12a, to which the VCO signal pressure is communiiated by conduit 9. The flow control disc 12b of the fuel valve is accordingly positioned by the signal pressure VCO.

In accordance with the invention, the auxiliary pressure ratio valve 11 is arranged to maintain a constant geometric ratio between the discharge pressure $P_2$ in conduit 10a and the pressure $P_c$ existing in the combustion chambers 2. This combustion space pressure is substantially equal to the discharge pressure of compressor 1, and is communicated to the valve 11 by a pressure sensing conduit 14.

The hydraulic servo mechanism which operates the pressure ratio valve 11 may be seen in Fig. 2. The main valve housing 15 defines an inlet chamber 16 having an inlet port 10e and an outlet chamber 17 with a discharge port 10f. Disposed between the inlet and outlet chambers is a valve seat member 18 forming a Venturi-shaped passage and retained in place by a snap-ring 19 or equivalent fastening means. The fluid throttling member comprises a valve disc assembly indicated generally at 20 as comprising an outer head member 21 with a contoured outer surface adapted to cooperate with the venturi 18 to form a streamlined annular throttling orifice. A central opening 22 in the member 21 is adapted to be closed by an inner head member 23 secured to a valve positioning rod 24. As shown in Fig. 2, the end head member 23 is threadedly received on the end of rod 24 and secured by a lock-nut 25. It will be apparent to those skilled in the valve art that this valve disc assembly constitutes a well-known type of flow control member used where the operating pressures are sufficiently high as to require a force of comparatively large magnitude to open the valve against the full inlet pressure. Initial upward movement of rod 24 causes the inner head member 23 to open the port 22 so that a limited amount of fluid can flow through the central opening 22 in the main flow control member 21. This limited flow permits some equalization of the pressure drop across the valve so that less force is required to move the outer head member 21. Upward movement of the rod 24 eventually causes the inner head member 23 to engage the threaded plug member 26, after which further upward movement of rod 24 causes the main flow control member 21 to rise. Such high pressure valve arrangements are well known to those skilled in the art and need not be further described herein.

The small auxiliary valve disc 23 also serves to control the flow at low flow rates with high differential pressure. This provides a wider range of flow control than can be obtained with a single large valve due to the manufacturing tolerances which are necessary.

The hydraulic servomotor for positioning the valve disc assembly 20 comprises a hydraulic cylinder indicated generally at 27, controlled by a servo pilot indicated generally at 28.

The hydraulic motor 27 comprises a housing portion 15a defining a cylindrical bore 27a in which is disposed a stationary bushing 29. This bushing assembly may conveniently be retained in position in bore 27a by means of a pair of retaining snap-rings 30, 31 engaging opposite end portions of the bushing. Bushing assembly 29 has a lower reduced end portion 32 formed separately so that the piston can be installed, and defining a recess housing a metal packing and scraper ring member 33. This member 33 is provided with a central bore having annular grooves forming "teeth" 34 which form close clearances with the rod 24 and serve to clean the axially moving rod of any dust or dirt particles which accumulate thereon from the in-flowing fuel gas. Thus, this dirt is prevented from traveling along the rod 24 and getting into the hydraulic actuating fluid.

The central portion of bushing 29 forms a recess 35 in which is slidably disposed the output piston 36. This is of course fastened to or formed integral with the piston rod 24 and may be provided with a circumferential groove containing a resilient packing ring 37. At its upper side, piston 36 is provided with an axially extending portion 38 which slidably projects through a bore portion 35a and has a still further reduced diameter end portion 39 which projects upwardly into a "sight glass" indicator 40, arranged so that the position of the piston rod extension 39 will indicate the degree of opening of the valve 20. The sight glass may of course be suitably graduated to read inches of travel of the flow control member 20. This sight indicator 40 may conveniently be threadedly received in a removable access opening cover plate 41, secured by threaded fastenings 42 to the housing wall portion defining a generously proportioned access opening 43, the function of which will be seen hereinafter.

Disposed in the bore 35 surrounding the piston rod extension 38 is a main biasing spring 44, which strongly urges the flow control valve 20 to the fully closed position. Hydraulic fluid for positioning piston 36 in opposition to spring 44 is admitted to the bore 35 by way of a pair of supply and drain passages 45, 46. The upper passage 45 communicates by way of an annular groove 47 in the outer surface of bushing 29 and one or more radial holes 48 with the bore portion 35, so as to act on the upper surface of piston 36. The lower passage 46 communicates by way of an annular groove 49 and one or more radial grooves 50 with the lower surface of piston 36.

The pilot valve assembly 28 serves to control the flow of hydraulic operating liquid to and from the motor 27 by way of the passages 45, 46 in the following manner. The pilot spindle 51 is provided with a plurality of axially spaced lands 52, 53, 54 adapted to cooperate with axially spaced ports in a stationary bushing 55. Land 52 is normally adapted to cover ports 56, communicating with an annular groove 57 and a drain passage 58. The intermediate land 53 normally covers a port 59 communicating with an annular groove 60 to which is supplied hydraulic operating liquid at a suitable pressure by way of an inlet conduit 61. This hydraulic liquid is supplied at a pressure on the order of 300 pounds per square inch from a suitable hydraulic pump, which is not shown but may conveniently be driven from the turbine rotor as one of the auxiliary devices associated with the regulator 8. The upper pilot spindle land 54 ordinarily covers drain ports 62 which communicate with an annular groove 63 and a drain port 64. Bushing 55 is also provided with lower ports 65 and upper ports 66.

It will be apparent from Fig. 2 that the pilot spindle 51 is adapted to slide vertically in bushing 55, which is held stationary in bore 55a by a lower snap-ring retainer 67 and an upper snap-ring 68.

In order to insure that dirt will not enter the hydraulic circuits, and to prevent contamination of the hydraulic actuating liquid by the fuel gas flowing through the valve, high pressure control oil from inlet conduit 61 is supplied from the groove 60 by way of a passage shown partly in dotted lines at 69 to an annular groove 70 in the outer surface of bushing 29, thence by way of one or more radial passages 71 to an annular recess 72, sealed by two O-ring packings 72a and 72b, located intermediate the piston rod cleaner member 33 and the piston 36. With this arrangement, high pressure oil in groove 72 tends to lubricate the two rings 72a, 72b, and if, for any reason, these packings leak, the high pressure oil will leak into the gas, rather than gas leaking into the lubricating system of the turbine.

The pilot spindle 51 is adapted to be positioned by a pair of opposed pressure responsive bellows assemblies indicated generally at 73 and 74 respectively. The lower bellows assembly 73 comprises a housing 73a which may conveniently be fabricated separately from the housing 16 and secured thereto by threaded fastenings 75 with a bushing member 76 clamped therebetween.

Housing 73a defines a cylindrical recess 77 into the open upper end of which bushing 76 projects. Disposed in recess 77 is a pressure responsive piston member 78 biased upwardly by a spring 79 and sealed to bushing 76 by a flexible bellows 80. Combustion space pressure $P_c$ is communicated by way of conduit 14 to a port 73b so that piston 78 is exposed to the combustion chamber pressure. The upper end portion of piston 78 is provided with a "ball-point" abutment member 81, which may be threadedly received in the end of piston 78 so as to be capable of adjustment. This ball-point member engages freely the end surface of the pilot valve land 52.

The second pressure-responsive bellows assembly 74 comprises a housing member 74a, defining a cylindrical recess 82 in which is disposed a piston member 83 biased downwardly by a coil spring 84, and sealed by a bellows member 85 to a bushing member 86. Bushing 86 is secured by threaded fastenings 87 between the housing 74a and the upper housing portion 15b, the latter being a cap member secured by a plurality of threaded fastenings 88 to the main housing member 16a. As will be apparent from Fig. 2, the respective ends of bellows 85 are sealed to the end head portion of piston 83 and to the upwardly projecting portion of bushing 86. The lower end portion of piston 83 projects through bushing 86 and carries a "ball-point" abutment 89 which may also be threadedly received in the end of piston 83 so as to be adjustable. As indicated in Fig. 1, the exit pressure $P_2$ in the conduit 18a is communicated to the pressure responsive assembly 74 by way of a pressure sensing conduit 18g.

The upper pressure responsive piston 83 does not bear directly on the pilot spindle 51, but acts through the agency of a variable ratio arrangement comprising a pivoted lever 90 supported at its right-hand end on a normally fixed fulcrum 91. The ball-point abutment 89 bears against the upper surface of lever 90, and the lower surface of the lever rests on the spherical end of a piston 92, which slides in the upper portion of bore 55a. Piston 92 engages the upper end of pilot spindle 51 by a push-rod 93 having an upper spherical end engaging the inner surface of piston 92 and a lower reduced end portion having a conical or spherical end disposed in a recess in the upper pilot land 54.

Thus, it will be apparent that the pilot spindle 51 is positioned by a force proportional to the combustion space pressure $P_c$ acting in opposition to the fuel supply pressure $P_2$. It is to be particularly noted that the upper ball-point abutment 89 engages the lever 90 at a location closer to the fulcrum 91 than the point of engagement between lever 90 and piston 92. Because of this inequality of the lever arms, the fuel supply pressure $P_2$ must be greater than the balancing force provided by the combustion space pressure $P_c$. This ratio may be adjusted somewhat by moving the fixed fulcrum 91 toward or away from the point of engagement with the ball-point 89 and piston 92. The means for effecting this adjustment is as follows.

The fulcrum 91 consists of a pivot carried in a yoke member 94, a top view of which is shown in Fig. 3. This yoke is formed integral with a slide member 95 having longitudinal edge portions 95a in dovetail engagement with a pair of transversely spaced guides 96. Slide 95 defines a rectangular opening 97 in which is disposed an eccentrically mounted cam 98 adapted to rotate on an upward extension 99 of the stationary bushing member 29. The cam may be retained on this extension 99 by means of a snap ring 100 (see Fig. 2) or equivalent retaining means. Two holes 101 are provided in cam 98 so that a suitable tool may be applied to the cam in order to adjust it rotatably about the projection 99, which action causes the slide 95 to move longitudinally in the guides 96 so as to move the fulcrum 91 to or from the ball point 89. When the desired adjustment is obtained, a locking-screw 102 is tightened.

It will be apparent that moving the fulcrum 91 toward or away from piston 92 and ball-point 89 will change the relative length of the lever arms on which these members operate. Thus, by changing the mechanical advantage by which the piston 83 acts on the pilot 51, the geometric ratio maintained between the fuel supply pressure $P_2$ and the combustion space pressure $P_c$ may be altered, for instance, from a value of about 1.2 to a value of about 1.5 with the mechanical arrangement shown in the drawings. It will also be observed that this adjustment is made by removing access plate 41, loosening lock-screw 102, and adjusting cam 98. This adjustment may easily be made, even while the powerplant is operating.

In order to stabilize the operation of the hydraulic servo mechanism, a pressure responsive follow-up mechanism is provided, as follows. The upper pilot drain chamber comprises a cylindrical recess 103 in which is disposed a follow-up piston 104, carried on a rod 105, the upper end of which carries a threaded fitting 106 with a transverse pivot 107 forming a pin and slot connection with the end of lever 90. Piston rod 105 passes through a bushing member 108 retained by snap-ring or equivalent retaining member. It will be apparent from Fig. 2 that the upper surface of follow-up piston 104 is exposed to the pressure of hydraulic operating liquid in the drain chamber 103. The lower surface of piston 104 is exposed to the pressure of liquid in the drain chamber 58 by reason of a communicating passageway 58a.

It need now be observed that spent operating liquid is drained from the lower chamber 58 by a restricted orifice 58b, the effective area of which may be varied by adjusting a conical pointed needle member 109 formed as a reduced end portion of a threaded adjusting screw 110. It will be apparent that the effective area of orifice 58b can be readily adjusted by turning set screw 110 and locking it with nut 111. Similarly, spent liquid is drained from the upper chamber 103 by way of a restricted port 103a with which cooperates an adjustable needle 112 carried on a threaded adjusting screw 113 having a lock-nut 114. Liquid discharged from ports 58b, 103a leaves by way of a communicating passageway 115 and drain conduit 116.

The operation of this hydraulic servo mechanism is as follows. Assuming first that the power plant is at rest with the flow control valve member 21 in closed position, under the influence of hydraulic motor biasing spring 44 and the pressure of the fuel gas supplied to inlet port 10e. Since the powerplant is not operating, there will be no hydraulic control oil pressure supplied to the pressure ratio valve 11 through conduit 61, nor will there by any VCO regulator oil pressure to act on control valve 12, which is therefore also closed. Thus, the pressure ratio valve 11 and fuel regulating valve 12 provide dual protection against fuel gas entering the powerplant and forming an explosive mixture therein when the plant is shut down. When it is desired to start the powerplant, electric motor 6 is energized and the compressor-turbine rotor caused to turn, with the result that the hydraulic pump associated with the fuel regulator 8 supplies control oil under pressure to conduit 61. It need now be noted that the coil springs 79, 84 associated with pressure sensing pistons 78, 83 respectively are so selected, and the adjustable ball-point abutments 81, 89 are so adjusted that, in the shutdown condition, the pilot spindle 51 will be slightly elevated so control oil from conduit 61 flows through port 59, past the intermediate land 53, by way of port 65, and passages 46, 49, 50 to the under-surface of piston 36, causing it to start upward. The resultant flow of fuel gas causes the pressure $P_2$ to rise. This produces a downward biasing force on piston 83, which tends to restore pilot 51 so as to cut off the supply of operating liquid to the underside of piston 36.

Meanwhile, the stabilizing effect of the follow-up piston 104 is produced as follows. As piston 36 moves upwardly, the hydraulic liquid occupying the space above the piston is forced out through passage 45, port 66, and past the upper land 54 through port 62 and groove 63 to the drain port 64. Now it will be seen that the rate at which this spent liquid is permitted to escape from drain chamber 103 is controlled by the adjustable orifice 103a. Because of this restricted discharge from the drain chamber 103, a pressure will be maintained on the upper surface of the follow-up piston 104. This introduces an additional downward biasing force on lever 90, which force is a function of the velocity of upward movement of the output piston 36. Thus, the follow-up piston 104 helps restore the pilot spindle 51 to its steady-state neutral position somewhat before the fuel supply pressure $P_2$ is adequate to center the pilot.

Conversely, when the powerplant is shut down, or when the pressure ratio $P_2/P_c$ becomes too high for any other reason, the pilot 51 moves downwardly, so that operating liquid is supplied from conduit 61 by way of port 65 and passage 45 to the upper surface of piston 36. The resulting downward movement of piston 36 expels liquid through grooves 50, 49, passage 46, port 65, and past the lower land 52 to port 56, groove 57, and discharge chamber 58. Now the restricted orifice 58b causes a pressure to be built up in chamber 58 so that a force is exerted upwardly on the bottom surface of the follow-up piston 104. This introduces an upward biasing effect on lever 90 which helps restore the pilot 51 to its aligned condition.

Thus, it will be apparent that the follow-up piston 104 introduces a stabilizing force proportional to the rate of movement of the flow control valve 20. It will also be apparent that this stabilizing effect may be made different for either direction of movement of the output piston 36, by separately adjusting the set screws 110, 113, so as to provide different degrees of restriction of the orifices 58b, 64a.

It may further be noted that the biasing springs 79, 84 and the adjustable ball-point abutments 81, 89 are preferably selected and adjusted so that the pilot will normally be positioned to maintain the flow control disc assembly 20 partially open, so that the supply pressure $P_2$ will never fall below some preselected minimum value, for instance on the order of 4 or 5 pounds per square inch gage, that being the minimum pressure desired in starting the gas-turbine powerplant.

Thus, the invention provides an effective fluid-pressure servo actuated valve for maintaining constant at a preselected value the relation between the fuel gas pressure supplied to the gas turbine regulating valve, relative to the combustion chamber pressure.

It will be obvious to those skilled in the art that many changes and substitutions of equivalents may be made in the mechanical details of this pressure ratio control valve; and it is of course desired to cover by the appended claims all such modifications as fall within the true spirit and scope of the invention.

What I claim as new and desire to secure by Letters Patent in the United States is:

1. In a servomotor the combination of fluid-pressure motor means with a reciprocable pilot valve spindle member having flow control portions adapted to control the motor, first expansible chamber means adapted to exert a force on said pilot proportional to a first signal pressure, second expansible chamber means adapted to exert a second force on the pilot spindle in opposition to said first force and proportional to a second signal pressure, and variable ratio lever means interposed between one of the pressure responsive means and the pilot spindle, said variable means comprising a lever disposed generally normal to the pilot spindle and having one side portion engaged by said last-mentioned pressure responsive means and an opposite side portion engaging the pilot spindle, normally fixed fulcrum means supporting said lever at one end thereof, said points of engagement of the opposite sides of the lever being at different distances from said fulcrum, and means for adjusting the fulcrum toward and away from said points of engagement whereby the mechanical advantage with which the respective pressure responsive means acts on the pilot spindle may be varied.

2. Servomechanism in accordance with claim 1 and including pressure-restoring follow-up means for imposing a restoring force on the pilot spindle as a function of the rate of movement of the fluid-pressure motor, said follow-up means comprising means for restricting fluid flow through the respective drain conduits from the pilot spindle for the corresponding directions of movement of the fluid-pressure motor, a follow-up piston connected to exert a restoring force on the variable ratio lever, and conduit means for subjecting opposite sides of said follow-up piston to the pressure of the fluid in said respective drain conduits at the upstream sides of said flow restrictions.

3. A pressure ratio controlling valve comprising throttling means for reducing the pressure in a fluid conduit, hydraulic motor means for positioning the throttling means, a pilot valve spindle member adapted to control the hydraulic motor, first pressure responsive means adapted to exert a force on said pilot proportional to a first signal pressure, second pressure responsive means adapted to exert a second force on the pilot spindle in opposition to said first force and proportional to a second signal pressure, variable ratio lever means interposed between one of the pressure responsive means and the hydraulic pilot spindle, said variable ratio lever having one side portion adapted to be engaged by the pressure responsive means and an opposite side portion adapted to engage the hydraulic pilot spindle, normally fixed fulcrum means supporting said lever at one end thereof, said points of engagement with opposite sides of the lever being at different distances from said fulcrum, and means for adjusting the fulcrum to and from said points of engagement whereby the mechanical advantage with which the pressure responsive means acts on the pilot spindle may be varied, and pressure restoring follow-up means for imposing a restoring force on the pilot spindle as a function of the rate of movement of the hydraulic motor, said follow-up means comprising means for restricting fluid flow through the drain conduits from the pilot spindle for the respective directions of movement of the hydraulic motor, a follow-up piston connected to said variable ratio lever, and conduit means for subjecting opposite sides of said follow-up piston to the pressure of the fluid in said respective restricted drain conduits.

4. In a servomotor for positioning a movable member in accordance with the geometric ratio between two fluid pressure signals, the combination of motor means having a pilot member adapted to control the motor, first expansible chamber means adapted to exert a force on said pilot proportional to a first signal pressure, second expansible chamber means adapted to exert a second force on the pilot in opposition to said first force and proportional to a second signal pressure, and ratio-determining lever means interposed between at least one of the pressure-responsive means and the pilot and comprising a lever member disposed between the pressure-responsive means and the pilot and having one portion engaged by said last-mentioned pressure-responsive means and another portion engaging the pilot, and fulcrum means pivotally supporting said lever member, said points of engagement with the lever being spaced at different distances from said fulcrum means.

References Cited in the file of this patent

UNITED STATES PATENTS

| Number | Name | Date |
|---|---|---|
| 1,052,588 | Janicki | Feb. 11, 1913 |
| 1,904,475 | Kissing | Apr. 18, 1933 |
| 2,237,070 | Cleveland | Apr. 1, 1941 |
| 2,422,808 | Stokes | June 24, 1947 |
| 2,438,663 | Greenland | Mar. 30, 1948 |
| 2,451,029 | Hughes | Oct. 12, 1948 |
| 2,508,260 | Holley | May 16, 1950 |
| 2,515,074 | Bobier | July 11, 1950 |
| 2,531,780 | Mock | Nov. 28, 1950 |
| 2,579,334 | Plank | Dec. 18, 1951 |
| 2,581,275 | Mock | Jan. 1, 1952 |
| 2,590,853 | Fulton | Apr. 1, 1952 |
| 2,604,756 | Greenland | July 29, 1952 |
| 2,616,254 | Mock | Nov. 4, 1952 |

FOREIGN PATENTS

| Number | Country | Date |
|---|---|---|
| 634,095 | Great Britain | Mar. 15, 1950 |